United States Patent [19]

Sansom et al.

[11] 4,223,360
[45] * Sep. 16, 1980

[54] MAGNETIC RECORDING TRANSDUCERS

[75] Inventors: David J. Sansom, Ottershaw; Derek F. Case, Sunbury-on-Thames, both of England

[73] Assignee: Data Recording Instrument Company, Ltd., Staines, England

[*] Notice: The portion of the term of this patent subsequent to Feb. 9, 1993, has been disclaimed.

[21] Appl. No.: 456,828

[22] Filed: Apr. 1, 1974

[30] Foreign Application Priority Data

Apr. 13, 1973 [GB] United Kingdom ............... 17863/73

[51] Int. Cl.² .......................... G11B 5/20; H01F 7/06; H01F 27/28
[52] U.S. Cl. ..................................... 360/123; 29/606; 336/226; 336/232
[58] Field of Search ................. 360/123; 29/603, 606; 335/282, 299; 336/226, 232

[56] References Cited

U.S. PATENT DOCUMENTS

| 3,549,825 | 12/1970 | Trimble | 360/123 |
| 3,601,871 | 8/1971 | Pierce | 360/123 |
| 3,634,632 | 1/1972 | Watson | 360/123 |

OTHER PUBLICATIONS

"Flat Circuit Coil", O'Donnell, IBM Tech. Disc. Bull., vol. 15, No. 2, Jul. 1972, p. 363.

Primary Examiner—Robert S. Tupper
Attorney, Agent, or Firm—Hane, Roberts, Spiecens & Cohen

[57] ABSTRACT

A magnetic transducing assembly including an elongate magnetic flux carrying core member, a substrate with a flat multi-turn spiral on a surface thereof and slit opening at the center of the spiral. The core is so engaged in the slit that the plane of the spiral is aligned with the elongate direction of the core and so that the spiral forms a coil about the core member.

5 Claims, 3 Drawing Figures

MAGNETIC RECORDING TRANSDUCERS

BACKGROUND OF INVENTION

This invention relates to magnetic transducing heads.

The heads which are used for reading and writing digital signals on magnetic tape or magnetic discs are usually very small. The size of the heads is determined mainly by the requirement for high rates which implies a high signal packing density within each recording track and close spacing of the tracks. Such heads must include reading and/or writing coils. The use of single turn coils has been proposed, but multi-turn coils are desirable in order to minimize the writing current and maximise the reading voltage. This presents a serious production problem in repeatedly threading a very small gauge wire through a very small window in the core structure.

SUMMARIES OF THE INVENTION

According to a first aspect of the invention there is provided a method of electrically coupling an elongate flux carrying means, comprising the steps of forming a flat multi-turn conductive spiral on a planar substrate having an opening within the centre of the spiral; and engaging the elongate flux carrying means with the opening whereby portions of the spiral are located on opposite sides of the longitudinal direction of the elongate flux carrying means, the substrate being so oriented with respect to the elongate flux carrying means that the plane of the substrate and the multi-turn spiral is aligned with the elongate direction of the flux carrying means.

According to a second aspect of the invention there is provided a magnetic transducing head assembly including an elongate magnetic flux carrying member and a planar substrate carrying a flat multi-turn conductive spiral on a surface thereof and having an opening within the centre of the spiral, said opening being so engaged by the flux carrying member that the plane of the substrate and the spiral is aligned with the elongate direction of the flux carrying member and that the spiral defines a multi-turn coil about said flux carrying member.

Preferably, the multi-turn coil includes on the opposite side of said substrate a second flat spiral of conducting material wound in the opposite sense on to the first spiral and mounted parallel therewith, there being a conductive connection formed through the substrate to join one end of the first-spiral to one end of the second spiral so as to produce a single multi-turn coil.

Conveniently the second spiral is mounted parallel to the first spiral and is so positioned that part of the second spiral extends beyond the first spiral, there being a first conductive pad attached to said one end of the second spiral and a second conductive pad positioned outside the first spiral and a second conductive connection formed through the substrate to join to the first and second pads.

BRIEF DESCRIPTION OF THE DRAWINGS

The invention will now be described by way of example, with reference to the accompanying drawings in which:

FIG. 1 shows three U-cores 1 which represent some of the cores in a multiple head unit which might be used for example, for recording and/or reading a multiplicity of tracks on a magnetic disc. The cores 1 are made of a suitable magnetic material such as ferrite or mumetal. A transducing coil coupled to each head core 1 is formed on a substrate layer of insulating material 2 which has a slit or gap 3 to allow the layer to be placed on the core in a figure-of-eight position. The insulating material may be a plastic film which is conventionally used in the manufacture of printed circuits. The film may be made of polyimide or it may be that sold under the trade name of 'Mylar', for example.

Figure 2:
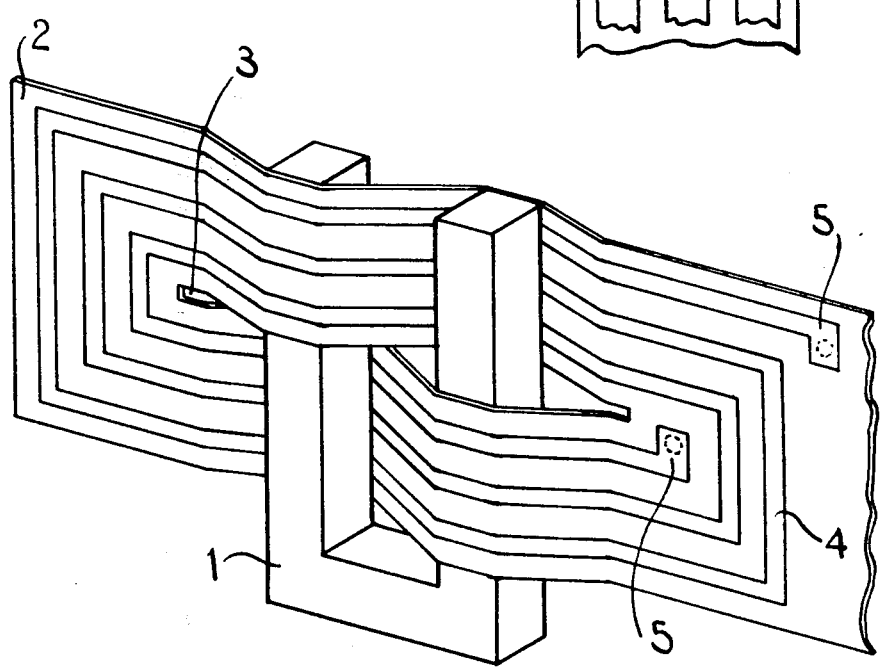
FIG. 2 is a more detailed view of a single head.

Each portion 2 carries a coil 4 (FIG. 2) in the form of a flat rectangular spiral. The coil is typically of copper and is formed preferably by one of the techniques conventionally used for the manufacture of printed circuits. Alternatively, the coil 4 could be formed by stamping from a thin foil and attached to the insulating layer by a suitable adhesive. The ends of the coil are terminated in connection pads 5.

Figure 1:
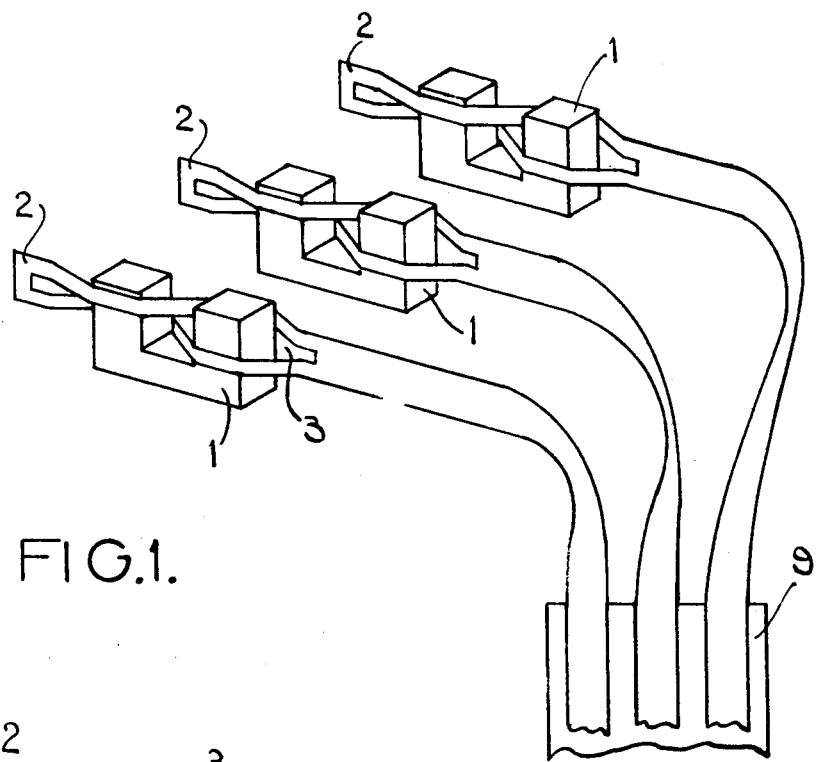
FIG. 1 is a general schematic view of one form of multiple head arrangement.

Connections 8 (FIG. 3) are made from the pads 5 through the layer 2 to termination pads such as the pads 6 on the other side of the layer 2. These pads are connected to strip conductors 7 which run along the layer 2 to provide the necessary connections between the coil and the associated reading/writing amplifier (not shown). The various portions 2 are joined together to form a single cable 9 (FIG. 1). The lengths of the separated portions 7 is such that they may be twisted through 90° and separated by a distance equal to the separation of the heads without imposing a strain on the cable. If the associated amplifiers are in the form of an integrated circuit package, this package may be mounted on the cable 9.

Figure 3:
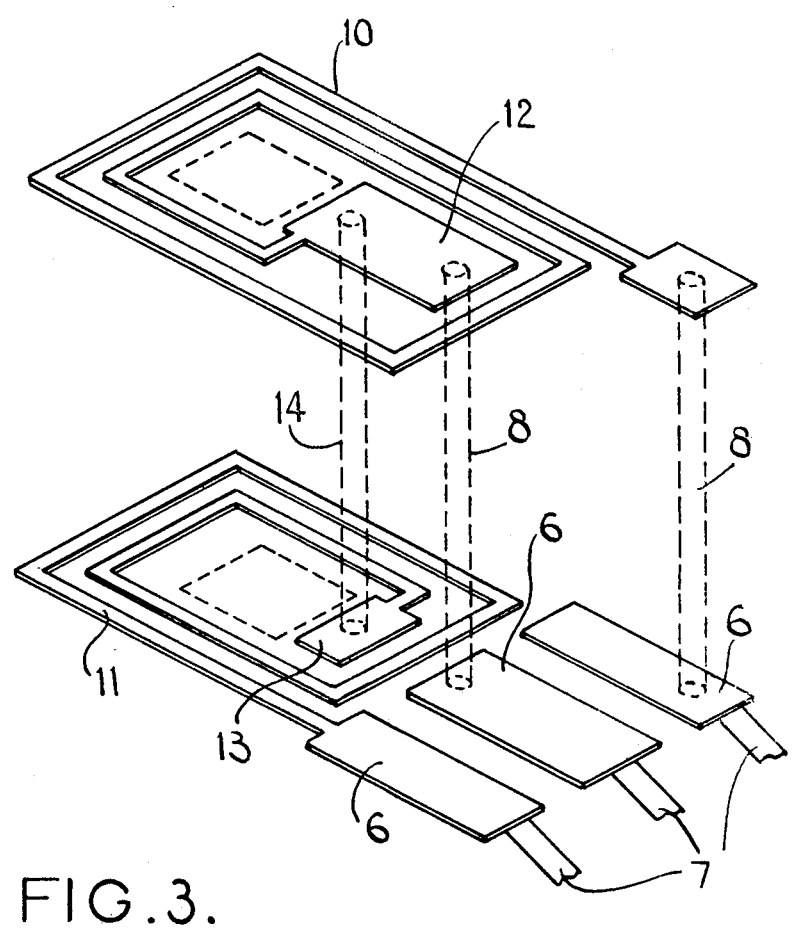
FIG. 3 illustrates the connections for a centre tapped coil.

The embodiment of the invention which has been so far described has employed a single coil, but other embodiments may utilise two or more coils. One such arrangement is shown in FIG. 3. The coil 4 of FIG. 2 may be considered as the equivalent of coil 10 of FIG. 3. A coil 11 is formed on the other surface of the layer 2, which is omitted from FIG. 3 for the sake of clarity. The coil 11 is wound in the opposite sense to the coil 10. The inner pads 12 and 13 of the two coils are joined through the layer 2 by a connection 14. The remaining free ends of the two coils 10 and 11 now provide the connections to effectively a single multi-turn coil.

The above mentioned transducing amplifiers frequently operate in a balanced mode which requires the provision of a centre tap on the transducing coil. The arrangement using the coils 10 and 11 is inherently suited to providing a centre tapped system if the two coils have equal numbers of turns. However, there is a problem in making a connection to the centre tap because the pads 12 and 13 are inside the coils 10 and 11. This problem may be overcome by extending the coil 10 sufficiently far beyond the boundary of the coil 11 to allow the pad 12 to extend across from the inside to the outside of the coil 10, as shown in FIG. 3. Thus, the coils are connected in series by the connection 14 between pads 12 and 13 and the centre tap is brought out for connection to one of the strip conductors 7 by the connection 8 between the pads 12 and 6. The appropriate positioning of the pad 12 may be obtained by modifying the dimensions of one coil as shown in FIG. 3, or by using similar coils which are displaced one relative to the other, or by a combination of these two methods.

The two coils 10 and 11 may be formed on separate portions of insulating material which are superimposed to align the coils, or they may be at different places on a single portion of insulating material which is folded to superimpose the coils. This superimposition may be repeated to produce a coil consisting of, say, three coils similar to the coils 10 and 11 instead of only one of each coil. The coils are connected to each other through the insulating layers in a similar manner to that already described when the coils are on separate layers. The interconnections may be made in the original conductive pattern when the superimposition is effected by folding. The actual connections may be made by conventional through hole plating techniques. for example.

The coil may link with only one limb of a U-core, or with an I-core. It will be understood that, in either case, the head structure will be completed by the attachment of an appropriate gapped pole piece structure to form a complete head assembly after the coil has been placed in position. The insulating layer may carry two, or more, coils separately connected to provide, say, separate read and write windings on a head.

It will be understood that the rectangular spiral shape of the coil is convenient from the point of view of fitting the coil on the core in the manner shown in FIG. 1, however, other shapes may be used, particularly if the coil is coupled to one limb only.

We claim:

1. A core and coil assembly for a magnetic transducing head, which assembly includes a core having two aligned self-supporting limbs; a substrate formed of sheet material and having two opposed internal edges defining a longitudinal opening; and a multi-turn conductive spiral carried on one face of said substrate and surrounding the said longitudinal opening; the region of said substrate bounded by one of said internal edges being bowed in one sense and the region of the said substrate bounded by the other of the said internal edges being bowed in the opposite sense; and the substrate being supported on at least one of the said limbs with the said one limb extending through the said opening and engaging both said bowed regions; the said multi-turn spiral thereby forming a multi-turn coil about the said core.

2. A core and coil assembly as claimed in claim 1, in which the other said limb passes through the said opening, each of the said regions of the substrate being bowed in the opposite sense in the vicinity of the said other limb to the sense in which it is bowed in the vicinity of the said one limb, the two said internal edges thereby adopting a figure-of-eight configuration.

3. A coil and core assembly as claimed in claim 1, in which a second multi-turn conductive spiral wound in the opposite sense to the first mentioned spiral is carried on the opposite face of the substrate, there being a conductive connection formed through the substrate to join the inner end of the first spiral to the inner end of the second spiral so as to produce a single multi-turn coil.

4. A coil and core assembly as claimed in claim 3, in which part of the second spiral extends beyond the first spiral, there being a first conductive region attached to said inner end of the second spiral, a second conductive region positioned outside the first spiral, and a second conductive connection formed through the substrate to join the first conductive region of the spiral to the second conductive region, the arrangement providing a centre tapping facility for the composite coil comprising said two spirals.

5. A coil and core assembly as claimed in claim 4, and including a third conductive region on the same side of the substrate as the second conductive region, and a third conductive connection between the outer end of the second spiral and the said third region, the arrangement being such as to enable all external connections to the spirals to be made to the same side of the substrate.

* * * * *